Jan. 31, 1956
G. A. FROJD
2,733,327
WELDING APPARATUS
Filed Nov. 9, 1951
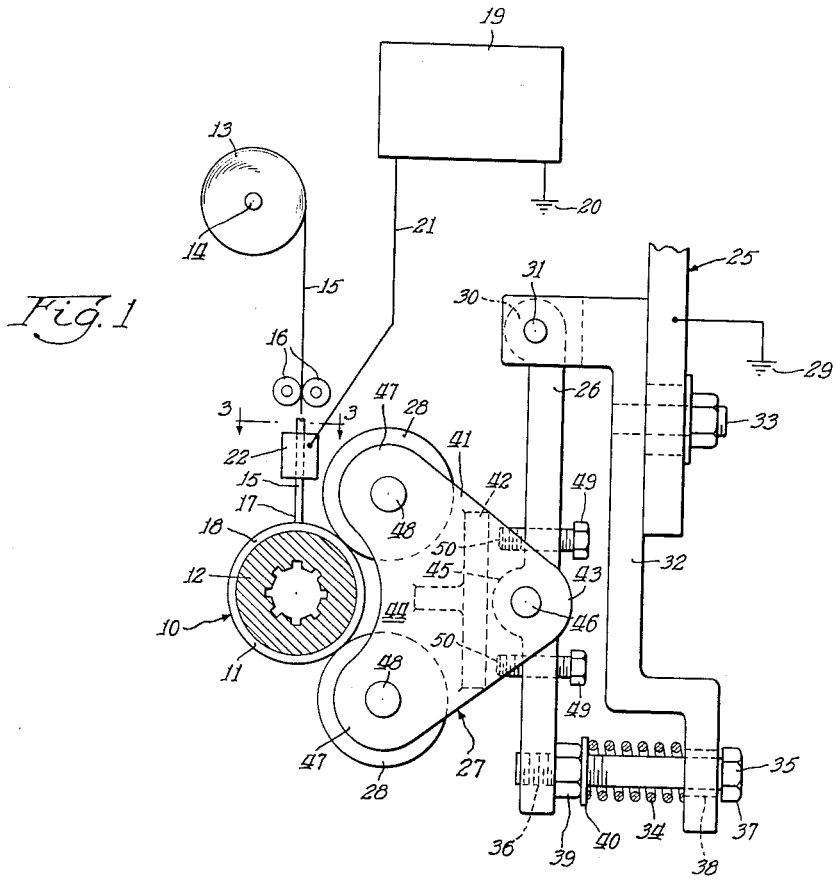
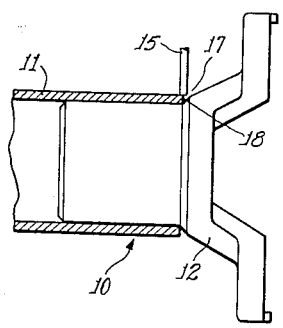
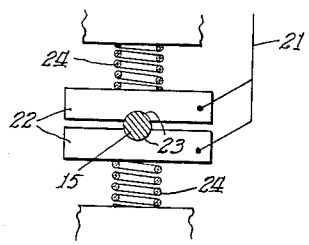
Inventor:
Gustav A. Frojd
By: H. J. Schmid Atty.

United States Patent Office 2,733,327
Patented Jan. 31, 1956

2,733,327

WELDING APPARATUS

Gustav A. Frojd, Rockford, Ill., assignor to Borg-Warner Corporation, Chicago, Ill., a corporation of Illinois Application November 9, 1951, Serial No. 255,575

7 Claims. (Cl. 219—8)

This invention relates to an improvement in electrical welding apparatus and more particularly to an arc welding machine embodying electrical contact elements yieldably held against a work piece.

The arc welding apparatus of the present invention is particularly useful for welding a metallic tubular portion of a member, such as a vehicle propeller shaft, about the metallic cylindrical portion of another member, such as a yoke portion of a universal joint. The apparatus includes generally means for supplying metallic welding rod to contiguous portions of the members to be welded, means for supplying electrical current to the welding rod, means for rotatably supporting the tubular member, a stationary support structure and metallic contact rollers yieldably held in contact with the tubular member for completing an electrical circuit which passes between the welding rod and the members to be welded to cause generation of heat and consequent arc welding of the members.

It is an object of the present invention to provide improved electrical welding apparatus for welding a metallic tubular portion of one member about a metallic cylindrical portion of another member.

Another object of the invention is to provide improvements in arc welding apparatus in the form of yieldable contacts for improving the electrical welding circuit by compensating for variations in the contacted surface of the work piece.

A further object of the invention is to provide improved arc welding apparatus for welding a metallic tubular portion of one member to a metallic cylindrical portion of another member and including electrical contact rollers yieldably held against the tubular portion of the member while the same is rotated during the welding process to provide a continuous improved electrical contact with the one member.

A specific object of the invention is to provide an improved electrical welding machine for welding a metallic tubular portion of one member to a metallic cylindrical portion of another member wherein the one member is rotatably supported and electrical current is passed through continuously supplied metallic welding rod to contiguous portions of the members to be welded with the current being grounded through a pair of metallic rollers yieldably held against the surface of the tubular portion of the one member when the same is rotated during the welding process.

Other objects, features and advantages of the present invention will be apparent from the following detailed description of one embodiment, by way of preferred example only, taken in conjunction with the accompanying drawings, in which:

Fig. 1 is a fragmentary, partly schematic view of welding apparatus according to the present invention with a work piece shown in section;

Fig. 2 is a fragmentary view of the work piece with one of the elements thereof shown in section to illustrate the relation of the welding rod to the work piece; and Fig. 3 is a partially sectional view taken along line 3—3 of Fig. 1 and showing a pair of electrical contacts engaging the welding rod.

As illustrated in the drawings, a work piece, generally designated as 10, includes a metallic tube or tubular member 11 with one end portion disposed in conforming relation about a cylindrical portion of another metallic member 12. In the specific embodiment of the invention described, the tubular metallic member 11 may comprise a vehicle propeller shaft and the metallic member 12 may comprise a yoke portion of a universal joint, but the invention is not to be restricted to this particular embodiment since it is generally applicable for use in welding together any two objects having a substantially circular circumference adjacent the area to be welded.

The work piece 10 may be supported in any satisfactory manner for manual or power driven rotation about its axis, but such means are not shown in the interest of simplicity of presentation. A welding rod supply spool 13 is rotatably supported on a pin 14 and is arranged to furnish a substantially continuous supply of metallic welding material, such as flexible round welding rod 15 as shown. Means in the form of a pair of manually or power driven rollers 16, 16 are provided for drawing the welding rod 15 from the spool 13 to insure a continuous replenishing of the used welding rod as the welding process proceeds. The rollers 16 urge the free end 17 of the welding rod against an annular welding area 18 of the work piece 10 at the end of the tube 11 contiguous to the member 12.

Energy for heating the end 17 of the welding rod 15 and the welding area 18 is provided in the form of electric current supplied by a power supply such as an electrical welding generator 19. The generator 19 may be grounded at 20 as shown and may be electrically connected to the welding rod 15 through a line 21 and a pair of electrical contact shoes 22, 22 shown in detail in Fig. 3. The shoes 22 slidably receive the welding rod 15 therebetween in a pair of opposed grooves 23, 23. The shoes 22 are yieldably urged into contact with the welding rod 15 by any suitable means such as a pair of compression springs 24, 24.

According to the present invention means are provided for continuously contacting the surface of the tube 11 as the same is rotated during the welding process for completing an electrical circuit back through the ground to the generator 19 in order that the electrical energy supplied by the generator will heat the end 17 of the welding rod 15 and the welding area 18 to the melting point due to electrical resistance in order to insure the formation of a satisfactory weld. Herein such means comprise a metallic stationary support structure 25, a metallic arm element 26, a metallic retainer structure 27 and a pair of contact rollers 28, 28, formed of a metal such as copper having a high electrical conductivity. The support structure 25 may be grounded at 29 as shown and the arm 26 may be electrically bonded (not shown) to the structure 25 and the retainer 27 if desired.

The arm 26 is arranged for limited movement in a plane substantially perpendicular to the axis of the tube 11 and, to this end, one end portion 30 is secured to the support structure 25 by means of a pin 31 allowing for pivoting of the arm about an axis substantially parallel to the tube 11.

A bar 32 is fixedly secured to the stationary structure 25 by means of a bolt 33. Yieldable means are provided for urging the outward end portion of the arm 26 away from the outward end portion of the bar 32, and in the present instance such means comprise a compression spring 34 disposed between the end portions of, and about, a limit bolt 35 which is threadedly inserted in a threaded aperture 36 in the outward end portion of the arm 26.

The end portion of the bolt 35 adjacent a head 37 is slidably disposed in a bore 38 formed in the associated end portion of the bar 32. A jam nut 39 is jammed against the portion of the arm 26 having the aperture 36, to prevent loosening of the bolt 35, and a bearing washer 40 is disposed between the jam nut and the compression spring 34.

The retainer structure 27 comprises a pair of end plates 41 (one shown) fixedly secured in spaced relation by means of a spacer element 42 which may be welded between the plates 41. The resultant structure provides a pair of opposite yoke end portions 43 and 44 with the yoke portion 43 pivotally secured about an enlarged central portion 45 of the arm 26 by means of a pivot pin 46. The axis of the pin 46 is substantially parallel to the tube 11 so that the retainer 27 is movable in a plane perpendicular to the axis of the tubular member 11. The contact rollers 28 are rotatably secured at opposite side portions 47, 47 of the yoke end 44 by means of pins 48, 48.

As will be seen, the structure is arranged so that the rollers 28 are yieldably held against the surface of the tube 11 and are arranged to rotate with the axes of the rollers parallel to the axis of the tube.

In order to provide means for adjusting the pivoting limits of the retainer structure 27 a pair of limit bolts 49, 49 are threadedly inserted through the arm 26 on corresponding opposite sides of the pivot pin 46. As shown, the ends 50, 50 of the bolts 49 are adapted for limiting engagement with the spacer element 42 of the yoke structure to provide an adjustable pivoting range of the retainer structure relative to the arm 26.

In operation, electrical current is supplied by means of the generator 19 and passes through the line 21 and the shoes 22 into the welding rod 15. The electrical current passes through the welding rod to the tube 11 and through the tube to the rollers 28. From here the electrical current is conducted through the retainer structure 27, the arm 26 and the support structure 25 back to the generator 19 through the ground. As is the case in any arc welding process, a substantial amount of heat is generated as the current passes from the rod 15 to the work piece 10, so that the end of the rod and the adjacent area of the work piece are melted to cause a welding of the members 11 and 12. It will be understood that the work piece 10 is rotated during the welding process so that a continuous annular weld is formed about the end periphery of the tube 11 and the adjacent portion of the member 12 to secure the tube 11 to the member 12. The used welding rod is continuously replenished from the spool 13 by means of the rollers 16. Flux supply means are provided in order to prevent oxidation of the work piece during the welding process, but since such means are not a portion of the present invention they are not shown in the interest of clarity.

Because of the pivoting action of the arm 26 and the retainer structure 27 the rollers 28 are yieldably urged into continuous electrical contact with the surface of the work piece 10 by means of the compression spring 34. The arrangement is such that the continuous contact will not be broken by imperfections in the surface of the tube 11, eccentricity of the tube, eccentricity of rotation of the tube, etc. Therefore, the current passing from the end of the weld rod will not vary and consequently the weld formed by the apparatus of this invention will be substantially uniform and free from defects.

It will be understood that modifications and variations may be effected without departing from the scope of the novel concepts of the present invention.

I claim:

1. Electrical contact mechanism for providing means for completing a continuous electrical circuit between the contact mechanism and a work piece comprising a plurality of metallic rollers of electrically conducting material adapted to be held in rolling contact with said work piece, means electrically connecting said rollers to a point of predetermined electrical potential including a retainer of electrically conducting material in electrical connection with said plurality of rollers and constructed and arranged to rotatably carry said rollers, and means associated with said retainer constructed and arranged to effect holding of said rollers in rolling contact with the work piece.

2. Electric contact mechanism for providing means for completing a continuous electrical circuit between the contact mechanism and a tubular work piece comprising a plurality of metallic rollers, a metallic retainer rotatably carrying said rollers in parallel relationship, a metallic element pivotally supporting said retainer, a stationary support, means pivotally mounting said element to said support, and spring means acting on said element for yieldably holding said rollers in rolling contact with the tubular work piece.

3. Electric contact mechanism for providing means for completing a continuous electrical circuit between the contact mechanism and a tubular work piece comprising a plurality of metallic rollers, a metallic retainer rotatably carrying said rollers in parallel relationship, a metallic element pivotally supporting said retainer, a stationary support pivotally mounting said element, and a compression spring acting between said element and said support for yieldably holding said rollers in rolling contact with said tubular work piece.

4. Electric contact mechanism for providing means for completing a continuous electrical circuit between the contact mechanism and a tubular work piece comprising a pair of metallic rollers, a metallic retainer rotatably carrying said rollers in parallel relationship, a metallic support structure, an arm element having one portion pivotally secured to said support structure for pivoting about an axis substantially parallel to the tubular axis of said work piece, means pivotally securing said retainer to said arm element for allowing pivoting of the same with said rollers held substantially parallel to the tubular axis of said work piece, and a compression spring acting between the other end portion of said arm element and said support structure for yieldably holding said rollers in rolling contact with said work piece.

5. Electric contact mechanism for providing means for completing a continuous electrical circuit between the contact mechanism and a tubular work piece consisting of a cylindrical shank portion of a member inserted in a metallic tube, said contact mechanism comprising a metallic stationary support structure, a metallic arm member, means pivotally securing one end portion of said arm member to said stationary support for pivoting about an axis parallel to the tube, a metallic retainer having opposite yoke end portions, means pivotally securing one of said yoke end portions about a portion of said arm member for pivoting about an axis parallel to said tube, a pair of metallic rollers, means rotatably securing said rollers within the other of the yoke end portions of said retainer in parallel relationship to said tube, and a compression spring acting between the other end portion of said arm member and said support structure for yieldably holding said rollers in rolling contact with said tube.

6. Electrical contact mechanism for association with a rotatable workpiece comprising a plurality of spaced rollers of conducting material, means rotatably mounting said rollers including conducting retainer means, a conducting arm, means pivotally mounting said arm, means electrically connecting said arm to a point of predetermined electric potential, means mounting said retainer means to said arm, and means resiliently biasing said arm for rotation about the pivotal mounting thereof whereby said rollers are resiliently held in contact with the workpiece.

7. Electric contact mechanism for association with a rotatable workpiece comprising a plurality of spaced rollers of conducting material; means rotatably mounting said rollers in spaced, parallel relationship, including conducting retainer means; a conducting arm; means pivotally mounting said arm; means electrically connecting said arm to a point of predetermined electric potential; means pivotally mounting said retainer means to said arm whereby said arm and said retainer means are in electrical and mechanical engagement, and means resiliently biasing said arm for rotation about the pivotal mounting thereof whereby said rollers are resiliently held in contact with the workpiece.

References Cited in the file of this patent

UNITED STATES PATENTS

| | | |
|---|---|---|
| 1,638,024 | Woodrow | Aug. 12, 1927 |
| 1,839,437 | Priebe | Jan. 5, 1932 |
| 1,862,642 | Van Henke | June 14, 1932 |
| 2,474,534 | Knost | June 28, 1949 |
| 2,475,051 | Raymond | July 5, 1949 |
| 2,527,815 | Hart | Oct. 31, 1950 |